United States Patent [19]

Maillefer

[11] Patent Number: 4,818,206
[45] Date of Patent: Apr. 4, 1989

[54] MULTI-SCREW EXTRUDER

[76] Inventor: Charles E. Maillefer, Au Village, 1164 Buchillon, Switzerland

[21] Appl. No.: 105,259

[22] Filed: Oct. 7, 1987

[30] Foreign Application Priority Data

Oct. 23, 1986 [CH] Switzerland .................. 42224/86

[51] Int. Cl.$^4$ .............................................. A01J 17/00
[52] U.S. Cl. ...................................... 425/204; 366/85
[58] Field of Search .................. 425/203, 204; 866/85, 866/84, 83, 291; 418/201, 202

[56] References Cited

U.S. PATENT DOCUMENTS

| | | | |
|---|---|---|---|
| 2,115,006 | 4/1938 | Burghauser | 366/85 |
| 2,686,336 | 8/1954 | Kleinlein et al. | 366/85 |
| 3,104,420 | 9/1963 | Selbach | 366/85 |
| 4,236,833 | 12/1980 | Blach | 366/85 |

Primary Examiner—Bernard Nozick
Attorney, Agent, or Firm—Parkhurst, Oliff & Berridge

[57] ABSTRACT

The inside surface of an extrusion cylinder (1) is divided into an upper surface (2) and a lower surface (3), each in the shape of an arc of a cylinder. The two surfaces intersect so that two screw sections (8, 9), each provided with a helical thread (12, 13), mesh with each other. The two threads are complementary in that the width of one thread (12) gradually increases from an entry opening (6) downstream, while the width of the other thread (13) decreases gradually from the upstream end toward the exit opening (7). Owing to separations between the free spaces, the material poured into the extruder through the entry opening is forced to pass once into a working zone in order to reach an exit chamber where the pressure is less than in the entry chamber.

6 Claims, 2 Drawing Sheets

MULTI-SCREW EXTRUDER

BACKGROUND AND SUMMARY OF THE INVENTION

This invention relates to extruders, and more particularly to a multi-screw extruder of the type having at least one extruder section formed by a cylinder with a first bore, a second bore, a feed passage, and an extraction passage, by a first screw, and by a second screw, and wherein the bores communicate laterally with one another and have inside surfaces including two common ridges, and the screws accommodated in the bores have mutually meshing threads bounding, together with the inside surfaces of the bores, free spaces containing the material to be extruded, and working zones in which the material to be extruded is subjected to shearing stress.

Multi-screw extruders are used when the structure of the material to be extruded is such that thrust resulting from friction against the inside surface of the cylinder, essential in single-screw extruders, is either insufficient or completely absent. Thus multi-screw extruders are preferably used when the material to be extruded is initially in powder form, especially when the coefficient of friction of the particles of this powder against the inside surface of the cylinder is low, or when the material has a tendency to adhere to the walls. In this case, the multi-screw arrangement, because of the mutual meshing of the threads of the different screws, creates a forced propulsion of the material downstream. However, the main shortcoming of multi-screw extruders is that the material is not homogeneously worked.

German Disclosed Application (DOS) No. 15 04449 describes a multi-screwextruder in which two meshing screw sections have threads of constant pitch but of complementary and gradually varying cross-section. The thread of one of the screw sections increases in width downstream, whereas the thread of the other decreases in width. In this prior art design, the two screws have different functions. The material is advanced only in the free spaces between the cylinder and the thread which increases in width downstream. It is moved while remaining in these spaces and is hence subject to gradual compression during its travel downstream. There is little or no mixing.

In most of the prior art multi-screw extruders, the free spaces associated with the screw threads have parallel functions, but the lack of homogeneity mentioned above also exists. This aspect will be discussed more fully below.

It is an object of this invention to provide an improved multi-screw extruder of the type initially mentioned which ensures homogeneous treatment of the material.

To this end, in the extruder according to the present invention, the feed passage communicates with the first bore and the extraction passage with the second bore, and means are provided for subjecting the material contained in the free spaces of the first screw to a higher pressure than that of the material contained in the free spaces of the second screw.

BRIEF DESCRIPTION OF THE DRAWINGS

A preferred embodiment of the invention will now be described in detail with reference to the accompanying drawings, in which.

DETAILED DESCRIPTION OF THE PREFERRED EMBODIMENTS

Figure 2:
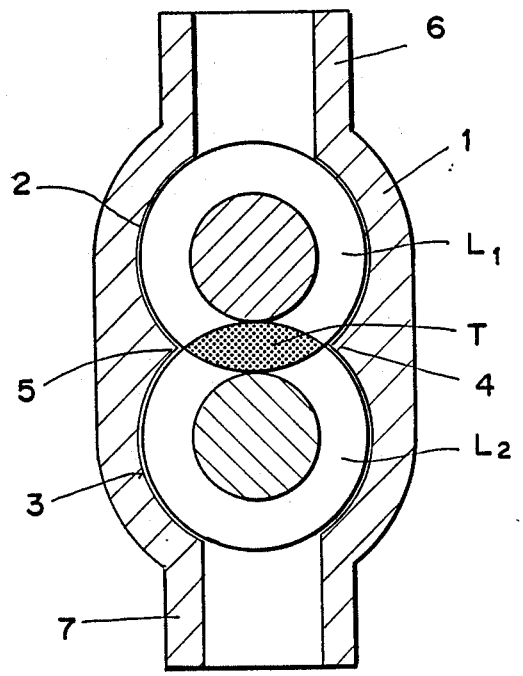
FIG. 2 is a section taken on the line II—II of FIG. 1.

Before a description is given of the section of a double-screw extruder shown in the drawings, the working of the plastic material as it is advanced axially will be explained on the basis of FIG. 2, which may represent an extruder having screw threads of constant cross-section.

Looking at a cross-section of an extruder with two screws having complementary threads (see FIG. 2), we see free spaces $L_1$ and $L_2$ and shear zones T. The free spaces form displacement chambers, the volume of which is generally constant or variable. The material is contained in these free spaces, bounded by the thread or threads of a screw and the inside surface of one or the other of the bores of the cylinder, and is moved downstream. In the shear zones T, on the other hand, the material is squeezed either between the flanks of the meshing threads or between the top of the thread of one or the other of the screws and the surface of the core of the opposing screw. Hence a double-screw arrangement delimits three different working zones between each free space of one screw and the adjacent free space of the other screw. In the course of rotation, the free spaces describe an apparent movement of downstream axial displacement, causing an actual movement of the material in that direction. With each screw revolution, part of the material is thrust into a working zone, while the rest of the material is moved downstream, remaining in the free space it occupies. The material which has just passed into a working zone enters a new free space and mixes more or less gradually with the rest of the material contained in that space. After several revolutions, certain parts of the material have thus passed into a working zone several times, whereas some other parts have not done so at all.

It is recognized that material passing into a working zone is subjected to heavy shear, which favors its heating and mixing. The particles that remain in their free space, on the other hand, are transported downstream without having been subjected to active treatment. As a result, these particles are poorly worked.

Thus, through the laws of chance, certain particles may pass through a working zone several times and others never. It may even happen that some particles are burnt or decomposed by too intensive working, while others are left "raw" or unworked. Hence the material is not homogeneous when it leaves the machine.

Let us suppose, for example, that with each revolution of the screws, 5% of the material passes into a working zone. After two revolutions, the calculation shows that 90.25% of the material will not have passed into a working zone, 9.5% will have passed once, and 0.25% will have passed twice. It may be calculated by combinatorial analysis what parts, after n revolutions of the screws, will still never have passed into a working zone, will have passed once, x times, etc., the part having passed n times being equal to $r^n$ if r is the proportion of passage of the input material into a working zone with each revolution. It would be desirable for all parts to have passed the same number of times, preferably once into one working zone, in order for the final result to be homogeneous.

Figure 1:
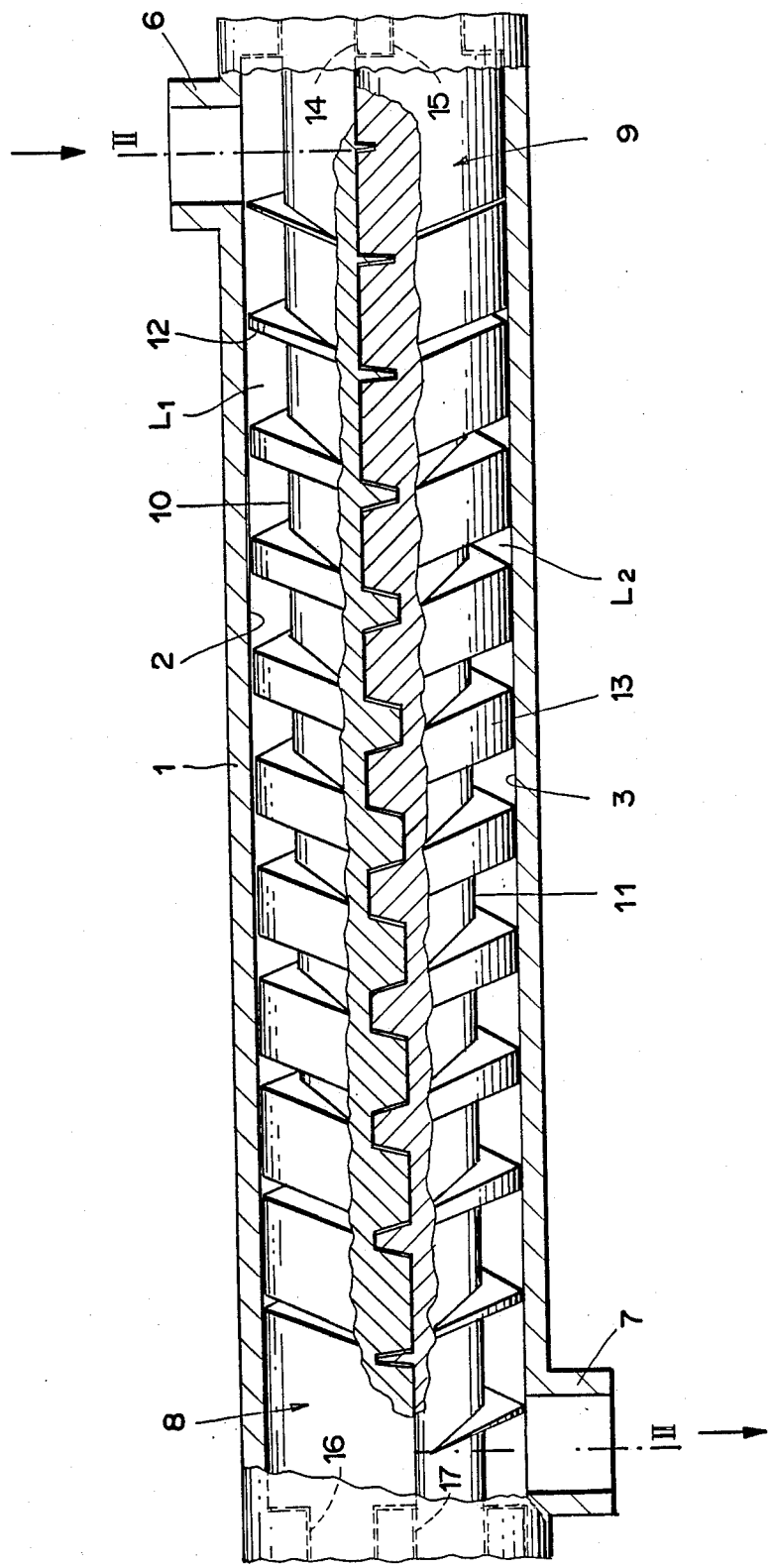
FIG. 1 is a diagrammatical longitudinal section through part of a double-screw extruder.

The double-screw extruder illustrated in this embodiment ensures that condition. It comprises a cylinder 1 having two parallel bores, the inside surfaces 2 and 3 of which bound an upper chamber and a lower chamber. However, the arrangement in a vertical plane, as shown in the drawing, is not critical. The two chambers might be situated at the same level instead. Surfaces 2 and 3 are cylindrical portions having parallel axes, and they intesect along two common generatrices 4 and 5 which are parallel and symmetrical relative to a plane containing the axes of the two bores. The displacement chambers are designated L1 and L2 (see FIG. 2). Upper chamber L1, acting as an entry chamber, is connected at the right-hand end of cylinder 1, as viewed in FIG. 1, to a feed tube 6 which may in turn be connected to a hopper, for instance, while lower chamber L2 is connected at the left-hand end of the extruder to an extraction tube 7 through which the material is led toward another section of the extruder or toward an extrusion head. Cylinder 1 of the extruder section being described contains two parallel screws 8 and 9 which, in the present embodiment, have the following characteristics: each of the two screws has a cylindrical core 10, 11 from which a helical thread 12, 13 projects. Threads 12 and 13 are of the same diameter and the same pitch and are so fitted that each of the screws 8 and 9 can rotate in one of the chambers L1, L2. Thread 12 has the particularity of gradually increasing in width downstream from feed tube 6, whereas thread 13 is complementary to thread 12 in that its width, which is substantially equal to the pitch at the upstream end of the extruder, gradually decreases downstream toward extraction tube 7. Upper chamber L1 is thus an entry channel which develops along a helical path downstream while its cross-section is gradually reduced, while chamber L2 is an exit channel having a cross-section which gradually widens. At each turn, threads 12 and 13 mesh with clearances to be adjusted according to the knowledge of those skilled in the art, on the basis of tests and according to the characteristics of the extruder, its conditions of use, and the material to be worked. The meshing zones of threads 12, 13 delimit working zones T and divide the chambers L1 and L2 into two series of crescent-shaped free spaces.

The diameters of tubes 6 and 7 are less than those of chambers L1 and L2, so that each of these tubes is connected solely to one of the chambers. Moreover, upstream from tube 6 and downstream from tube 7, the extruder section shown is so arranged as to shut chambers L1 and L2. Thus, cores 10 and 11 of screws 8 and 9 include upstream and downstream extensions which pass through gaskets 14, 15, 16, 17 and close chambers L1 and L2 relative to the outside of the extruder, or to another extruder section (not shown) in which the operating conditions may be different.

The flow of material entering the extruder through tube 6 will therefore be entirely contained in entry channel L1 at first. However, owing to the gradual narrowing of this channel and to the transport effect, as each free space moves it produces a compression effect which forces the material to pass gradually into the clearances of working zones T to reach exit chamber L2. The material which has passed into a working zone reaches a free space of screw 9, the volume of which gradually increases toward tube 7. During operation, because the meshing of the threads produces working zones T, the pressure in chamber L2 will be less than that of chamber L1. Consequently, all the material will have passed once and once only into a working zone T during the displacement of the free space in which it is contained from upstream to downstream.

The extruder section described above may be preceded by a feed section in which the temperature of the material is brought close to its softening point, so that the phenomenon of melting takes place gradually in the extruder section described above by heating due to internal friction in the working zones. By the same token, the extruder section described above might equally well be followed by a metering zone, a mixing zone, or any other extruder section.

The means of driving screws 8 and 9 is not shown. They will be supported by bearings and coupled to pulleys or gear trains which are in turn actuated by known means, the two screws being driven positively.

The arrangement described applies not only to double-screw extruders but generally speaking to any multi-screw extruder. Instead of modifying the widths of the threads in order to vary the volume of the free spaces in the entry and exit chambers—the threads having a constant diameter, pitch, and height over the whole length of the screw, as shown in the drawing—the gradual change in volume of the free spaces may be obtained by varying the diameter of the core of the screw or by varying the diameter of the entry and exit chambers. This change may likewise be produced by gradually modifying the pitch of the threads or any other structural characteristic. The arrangement of the working zones T may also differ from what is shown schematically in FIG. 2. The threads of the two screws need not mesh to their full depth. If need be, the desired result could be achieved by keeping at each turn a single working zone between the tops of two matching threads situated facing one another and each comprised by one of said screws.

With the arrangement described, the thermal conditions in the entry channel are different from those in the exit channel. It is possible to equip the walls of the two bores either with heat-insulating means or with heating or cooling means.

What is claimed is:

1. A machine section is a multi-screw machine for processing plastics material, said machine section comprising:

a cylinder extending longitudinally from an inlet end to an outlet end and including, a first bore having a first inner surface, a second bore having a second inner surface, and a feed passage at said inlet end having an inlet opening in said first inner surface, and an extraction passage at said outlet end having an outlet opening in said second inner surface;

a first screw accommodated in said first bore and a second screw accommodated in said second bore, said first and second bores being connected to one another laterally, said first and second inner surfaces having two common ridges extending from said inlet end to said outlet end, said screws having both a core and mutually meshing thread means, and being supported by bearings outwardly of said bores;

said inner surfaces, said cores and said thread means defining a plurality of crescent-shaped free spaces in each of said first and second bores and a plurality of gaps of predetermined clearances between said free spaces, said free spaces decreasing in volume in said first bore from said inlet end to said outlet end, said free spaces increasing in volume in said second bore from said inlet end to said outlet end; and said inlet and outlet openings continuously and directly communicating with at least one of said free spaces in said first and second bores, respectively, to introduce said plastics material into said first bore and discharge said plastics material from said second bore, said machine section operating as a melting section of an extrusion machine, the pressure in said first bore being higher than the pressure in said second bore.

2. The machine section of claim 1, wherein at least one of the height, width, diameter, and pitch of said thread means varies for providing the variation in volume of said free spaces.

3. The machine section of claim 1, comprising an entry channel bounded by said thread means of said first screw and the inside surface of said first bore and an exit channel bounded by said thread means of said second screw and the inside surface of said second bore, the cross-section of said entry channel becoming smaller and the cross-section of said exit channel becoming larger in the direction of travel of the plastics material.

4. The machine section of claim 1, wherein said threads means are complementary helical threads having cross-sections gradually varying along the lengths of said screws, whereby the volumes of said free spaces likewise vary gradually.

5. The machine section for processing plastics material according to claim 4 wherein said bores and said cores are of cylindrical shape, said thread cross-sections vary in thickness along the machine section and, in each of said first and second screws the corresponding thread means comprises in front of one of said openings where the thread is the thinnest, a portion with a height which progressively decreases towards the corresponding end of the section.

6. A machine section in a multi-screw machine for processing plastics material, said machine section comprising:

a cylinder extending longitudinally from an inlet end to an outlet end and including, a first bore having a first inner surface, a second bore having a second inner surface, and a feed passage at said inlet end having an inlet opening in said first inner surface, and an extraction passage at said outlet end having an outlet opening in said second inner surface;

a first screw accommodated in said first bore and a second screw accommodated in said second bore, said first and second bores being connected to one another laterally, said first and second inner surfaces having two common ridges extending from said inlet end to said outlet end, said screws having both a core and mutually meshing thread means, and being supported by bearings outwardly of said bores;

said inner surfaces, said cores and said thread means defining a plurality of crescent-shaped free spaces in each of said first and second bores and a plurality of gaps of predetermined clearances between said free spaces, said free spaces decreasing in volume in said first bore from said inlet end to said outlet end, said free spaces increasing in volume in said second bore from said inlet end to said outlet end;

said inlet and outlet openings continuously and directly communicating with at least one of said free spaces in said first and second bores, respectively, to introduce said plastics material into said first bore and discharge said plastics material from said second bore, said machine section operating as a melting section of an extrusion machine, the pressure in said first bore being higher than the pressure in said second bore;

an entry channel bounded by said thread means of said first screw and the inside surface of said bore and an exit channel bounded by said thread means of said second screw and the inside surface of said second bore, the cross-section of said entry channel becoming smaller and the cross-section of said exit channel becoming larger in the direction of travel of the plastics material; and first and second gasket means disposed between said first and second screws and said cylinder, said first gasket means being situated upstream from said feed passage, and said second gasket means being situated downstream of said extraction passage.

* * * * *